United States Patent Office 2,727,588
Patented Dec. 20, 1955

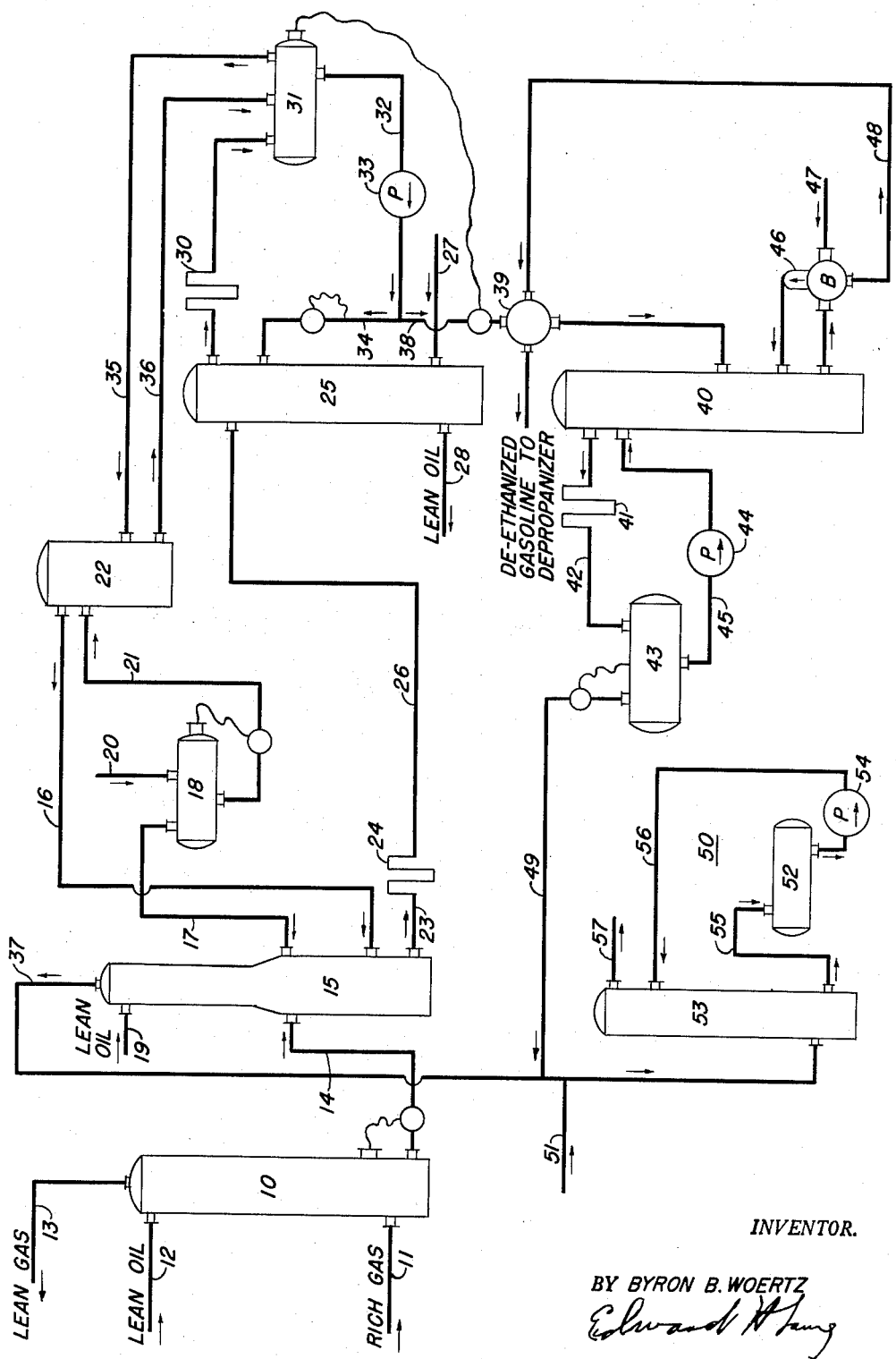

2,727,588

GAS ENGINE FUEL

Byron B. Woertz, Crystal Lake, Ill., assignor to The Pure Oil Company, Chicago, Ill., a corporation of Ohio Application September 24, 1953, Serial No. 382,165

8 Claims. (Cl. 183—115)

This invention relates to a method and apparatus for obtaining a substantially uniform fuel gas composition, as evidenced by its heat of combustion, from natural gasoline plants and, more particularly, relates to a method and means to accomplish the above result by subjecting the exit gases normally used for fuel to continuous intimate contact with a substantially fixed volume of an absorbing medium in a relatively small closed system wherein equilibrium conditions between the exit gases and the absorbing medium are substantially maintained.

In the modern natural gasoline plants, the gasoline hydrocarbons are removed from natural gas by contact with absorber oil in a system of absorption and stripping stages. In many such plants, the compressors and generators are driven by gas burning internal combustion engines and that portion of the fixed gases not so consumed is stored and sold for heating and other purposes. The gases are generally sold on the basis of a gross heating value such as 1000 or 1050 B. t. u. per cubic foot. As a matter of economics, any gas stream having a heating value much above these values is not sold since no premium is paid for excess heating value. Sometimes high B. t. u. gases are used to increase the heating value of the gas stream from the main absorber. Gasoline plants usually have a demethanizing re-absorber, or its equivalent, from which is produced a gas stream rich in ethane and propane. In addition, the non-condensibles issuing from the de-ethanizers are very high in ethane content. These gas streams, in the absence of a proper market for ethane vapor, are normally burned in the plant, either in the boilers, direct-fired heaters, or gas-burning engines. The efficient operation of such equipment is directly dependent upon the burning qualities of the gas mixture used in their operation. Small variations in the burning qualities brought about by changes in the gas composition cause erratic operation of the gas engines, uneven heating or combustion in the boilers or heaters, and the possible danger from failure of necessary equipment at critical times.

The present invention is directed to a method and apparatus for eliminating the aforementioned difficulties by providing an absorption system employing a liquid or solid absorbent, preferably an absorber oil in the fuel gas line which is substantially in equilibrium with the gas passing through to attain a constant fuel gas composition. Although the invention has been so far described in connection with natural gas plants, it is not to be limited thereby and finds application to any problem where it is necessary to provide a substantially constant hydrocarbon gas composition. One of the essential features of the invention is the simplicity of equipment used and the relatively small amount of circulating absorbent supply to be maintained in equilibrium with an incoming gas stream. It is also essential that the absorbent be in equilibrium with the gases; in other words, when a hydrocarbon oil is used that the absorber oil remains practically saturated with the principal components of the gases in proportion to their vapor pressures. Accordingly, any change or fluctuation of the composition of the incoming gas causes a re-absorption and/or desorption process to take place to maintain a natural equilibrium under the conditions of temperature and pressure imposed. With the relatively high absorption capacity of the volume of absorber oil, the gas composition with respect to the content of ethane and heavier hydrocarbons cannot change quickly as it does in the gasoline plant system itself. The result is less fluctuation in heating value and, hence, less change in the required air-fuel ratio of the devices which employ the gas as fuel. The improved steadiness in fuel composition substantially eliminates erratic and uncertain engine operation and the difficulties, expenses, and dangers arising therefrom.

The single figure of the drawing shows a flow diagram of the principal parts of a natural gasoline plant incorporating the apparatus of the present invention.

Accordingly, the primary object of this invention is to provide a method and apparatus whereby a substantially constant composition gas stream can be maintained from a given source of gaseous hydrocarbons.

A second object of the invention is to provide a method of producing a substantially constant gas stream from a source of gases which are fluctuating in composition.

A third object of the invention is to provide an absorption apparatus to produce a substantially constant gas stream from a source of gases which vary in composition from time to time.

Another object is a method and apparatus to be used in conjunction with a natural gasoline plant wherein the exit fixed gases therefrom are subjected to contact with a constant supply of recirculating absorber medium under equilibrium conditions whereby there is obtained a final gas stream of substantially constant composition and heat of combustion.

Other objects will become apparent as the description of the invention proceeds.

Referring to the drawing, which shows the use of the apparatus and the application of the method to a natural gasoline plant, number 10 represents the main absorber. Rich gas at a pressure of about 645 pounds per square inch and comprising $C_1$ to $C_5$ hydrocarbons enters at line 11 and passes in countercurrent contact with lean absorber oil entering at line 12. Any suitable contacting means (not shown) as bubble trays, Raschig rings, or Berl saddles may be used in the main absorber 10. Lean gas comprising chiefly $C_1$ and $C_2$ hydrocarbons leaves the absorber by line 13. Rich oil containing dissolved $C_3$ to $C_5$ and some lighter hydrocarbons passes from absorber 10, via line 14 to demethanizing re-absorber 15. The re-absorber 15 operates at about 125 pounds per square inch and brings the rich oil into contact with non-condensibles entering at line 16, the source of which will be subsequently described, and flash gas entering via line 17 from condensate flash drum 18. Additional lean oil is conveyed into re-absorber 15 by line 19. Compression condensate obtained from the rich gas compressors (not shown) is conducted via line 20 into drum 18 wherein a reduction of pressure to about 160 pounds per square inch causes the flashing off of any light components designated as flash gas passing through line 17. Flashed condensate or residue not vaporizable under the conditions within drum 18 passes via line 21 to condensate contactor 22. Within condensate contactor 22 operating at 130 p. s. i. g., a stabilizing operation is conducted in that light hydrocarbons are stripped and heavy ones are absorbed. The still non-condensibles enter as stream 35 and after rectification, the non-condensibles leave for recycle through line 16.

Rich oil from the re-absorber 15 is passed through line 23 to direct fired heaters designated at 24 and then to stripper still 25 through line 26. Steam at about 150 pounds per square inch or higher is introduced at line 27 into still 25 to aid in removing gasoline and lighter hydrocarbons from the rich oil. The stripped oil leaves still 25 at line 28 for recycle after cooling. The overhead gases from still 25 pass to condenser 30 and the condensate therefrom is collected in accumulator 31. Portions of the raw condensate are drawn off by line 32 and pump 33 and pass to still 25 via line 34 as reflux. Any non-condensibles are returned to the system via line 35 from accumulator 31. Partially stabilized condensate is passed to the accumulator by line 36.

The rich fuel gas stream from re-absorber 15 comprising inert gases, $C_1$—$C_2$ hydrocarbons, and very small amounts of $C_3$—$C_5$ hydrocarbons passes off via line 37. Excess raw gasoline over that required for still reflux from accumulator 31 is passed via line 38 through heat exchanger 39 to de-ethanizer 40. A pressure of about 525 p. s. i. g. is maintained in de-ethanizer 40 whereby de-ethanizer gas comprising substantially $C_2$ with some $C_3$ hydrocarbons is driven off to condenser 41 via line 42 to reflux accumulator 43. The required reflux is recirculated back to the de-ethanizer by pump 44 and line 45. Reboiler 46 continuously reheats the gasoline bottoms in de-ethanizer 40 through the application of heat by line 47. The de-ethanized gasoline bottoms are passed via line 48 through heat exchanger 39 to a depropanizer (not shown).

De-ethanizer gas, high in $C_2$ hydrocarbons, is passed through line 49, to mix with rich gas in line 37, to the fuel gas absorber system of the present invention designated at 50. The gases to be treated in accordance with the invention comprise the rich gas from the demethanizer re-absorber 15, the de-ethanizer gas from accumulator 43, and any make-up gas, which may be required, from main absorber 10 (line 13). The main absorber make-up gas is shown as passing into the system through line 51. The component parts of the apparatus of the present invention comprise a recirculating absorber oil tank 52, an absorber 53, and a circulating pump 54 with suitable conduits 55 and 56. Pump 54 continuously circulates absorber oil from tank 52 through line 56 into absorber 53. Rich oil overflow 55 leads into tank 52. The stabilized substantially constant composition product fuel gas leaves the system via line 57.

The absorber system 50 is operated so as to constantly contact the incoming fuel gas in absorber 53 with absorber oil at such a rate and under such conditions that equilibrium is established therein. Contact of the fuel gas and absorber oil may be concurrent, countercurrent or by a mixer-settler type operation as long as intimate contact is obtained. The absorber oil is not changed and only renewed to replace that lost due to leaks in the system and other causes. The circulating absorber oil is kept at a temperature of about 70° to 100° F. and the absorber is operated at a pressure ranging from 110 to 120 pounds per square inch.

In Table I, following, are shown typical gas compositions of the exit gas from the demethanizing re-absorber 15 and the de-ethanizer 40 with their average blended heating values.

TABLE I

*Compositions (typical)*

| | Gas Out Demethanizing Re-Absorber | De-ethanizer Gas | Blended Gas (Ave.) |
|---|---|---|---|
| | Vol. percent | | |
| $N_2$ | 1.72 | | 1.42 |
| $CH_4$ | 57.81 | | 47.82 |
| $C_2H_6$ | 36.31 | 82.03 | 44.21 |
| $C_3H_8$ | 3.78 | 17.97 | 6.23 |
| iso-$C_4H_{10}$ | 0.08 | | 0.07 |
| n-$C_4H_{10}$ | 0.10 | | 0.08 |
| iso-$C_5H_{12}$ | 0.20 | | 0.17 |
| Total | 100.00 | 100.00 | 100.00 |
| Gross Heating Value, B. t. u./cu. ft. | 1,337 | 1,906 | 1,435 |

With absorber 53 operating at a preferred pressure of 115 pounds per square inch and 70° F., which constitute average yearly conditions, one cubic foot of the rich oil in equilibrium with one cubic foot of average blended gas will contain about 0.00788 pound mols of methane, 0.0425 pound mols of ethane and 0.0189 pound mols of propane. The relationship is shown in the following Table II:

TABLE II

| | 1 cu. ft. Equilibrium Rich Oil | 1 cu. ft. Blended Gas (Ave.) | Ratio, Mols in Oils/Mols in Gas (1 cu. ft. ea.) |
|---|---|---|---|
| Methane, pound mols | 0.00788 | 0.0109 | 0.723 |
| Ethane, pound mols | 0.0425 | 0.0101 | 4.21 |
| Propane, pound mols | 0.0189 | 0.00142 | 13.3 |

The mechanism of this invention becomes increasingly more effective as the molecular weights of the gaseous components increase, but this feature is not well illustrated by the above example because of the very small amount of butanes and heavier present. The above tabulation shows how oil absorption is more effective in storing quantities of ethane and heavier, than is storage of the gas itself at 115 p. s. i. g. (130 p. s. i. a.), and this invention shows how such data is utilized in an apparatus to produce a uniform fuel gas for the satisfactory operation of gas engines, and to improve the over-all economy of operation of a natural gasoline plant.

By practicing the method a substantially constant composition hydrocarbon fuel gas can be obtained from the demethanizing rich oil re-absorber gases and the de-ethanizer gas blend from a gasoline plant or from any suitable source of low melecular weight hydrocarbons by maintaining intimate equilibrium contact with a supply of absorbing medium, preferably an absorber oil. Any variable composition gas stream containing about 20 mol per cent of ethane and heavier hydrocarbons may be treated in accordance with this invention or may be substituted for all or part of the demethanizing rich oil re-absorber gas undergoing treatment. Further, the demethanizing rich oil re-absorber gas may be replaced in whole or in part by any gas stream resulting from a stabilizing or rectifying operation on compression condensate or rich oil from a natural gasoline plant.

The intimate contact with an absorbing medium as set forth herein is carried out at about 70° to 100° F. and at a pressure equal to or slightly lower than that of the lowest pressure gas stream to be processed.

Although the invention has been described using a liquid hydrocarbon oil as the absorbing medium, it is not necessarily limited thereby. The invention encompasses any absorber medium, liquid or solid which will obtain the results described. Certain organic solvents can be substituted for hydrocarbon oil which is only preferred because of its low cost and availability. Selected hydrocarbon fractions may be used as absorber oil. Solid absorbents such as clays, silica gel and the like could be used, provided intimate contact with a sufficiently large volume of the solid is maintained. An example of an absorber oil would be a petroleum distillate boiling in the light gas oil range as from 500°–700° F.

What is claimed is:

1. A method of producing a substantially constant composition hydrocarbon fuel gas from a mixture of demethanizer rich oil re-absorber gas and the de-ethanizer gas blend from a gasoline plant comprising subjecting a mixture of said gases to contact with an absorbing medium in an absorber under conditions such that the absorbing medium becomes substantially saturated with said mixture of gases under equilibrium conditions, recycling said absorber medium directly back to the absorber without regeneration and withdrawing constant composition fuel gas from said absorber.

2. The method in accordance with claim 1 in which the absorbing medium is a hydrocarbon oil.

3. The method in accordance with claim 1 in which the gas stream being treated comprises a variable composition hydrocarbon gas containing about 20 mol per cent of ethane and heavier hydrocarbons along with said demethanizing rich oil re-absorber gas.

4. The method in accordance with claim 1 in which the demethanizing rich oil re-absorber gas is replaced at least in part by a gas stream resulting from a stabilizing operation on compression condensate from a natural gasoline plant.

5. The method in accordance with claim 4 in which the demethanizing rich oil re-absorber gas is replaced at least in part by a gas stream from a stabilizing operation on rich oil from a natural gasoline plant.

6. The method in accordance with claim 1 in which the gas mixture includes the lean hydrocarbon gases issuing from the main absorber of the gasoline plant.

7. The method in accordance with claim 1 in which the contact is carried out at about 70° to 100° F. and at a pressure equal or slightly lower than that of the lowest pressure gas stream to be processed.

8. The method in accordance with claim 1 in which the contact is carried out at about 70° to 100° F. under 110 to 120 pounds per square inch.

References Cited in the file of this patent

UNITED STATES PATENTS

| | | |
|---|---|---|
| 2,059,494 | Shiras | Nov. 3, 1936 |
| 2,600,133 | Simms | June 10, 1952 |
| 2,608,270 | McDonald, Jr., et al. | Aug. 26, 1952 |
| 2,638,437 | Ragatz | May 12, 1953 |